United States Patent [19]

Quinn et al.

[11] 4,358,563

[45] Nov. 9, 1982

[54] POLYCARBONATE COMPOSITION

[75] Inventors: Clayton B. Quinn; William Hilakos, both of Mt. Vernon, Ind.

[73] Assignee: General Electric Company, Mt. Vernon, Ind.

[21] Appl. No.: 235,113

[22] Filed: Feb. 17, 1981

[51] Int. Cl.³ .................... C08L 23/06; C08L 23/12; C08L 69/00

[52] U.S. Cl. .................................... 525/146; 528/196

[58] Field of Search .................. 260/23 H, 18 TN; 525/146; 528/196

[56] References Cited

U.S. PATENT DOCUMENTS 3,203,926 8/1965 Deanin et al. ............... 260/18 TN
3,290,409 12/1966 Munro ............................. 528/196
3,477,978 11/1969 Holub et al. ................... 525/146
3,801,673 4/1974 O'Connell ..................... 260/47 XA
4,097,457 6/1978 Megumi et al. ................ 528/196

FOREIGN PATENT DOCUMENTS 705481 3/1965 Canada .......................... 525/146
2620255.1 11/1977 Fed. Rep. of Germany .
2620255.2 11/1977 Fed. Rep. of Germany .

*Primary Examiner*—Ronald W. Griffin
*Attorney, Agent, or Firm*—Martin B. Barancik; William F. Mufatti

[57] ABSTRACT

This invention is directed to an impact modified polycarbonate composition comprising in admixture a high molecular weight aromatic carbonate polymer terminated with a novel endcapper and a minor amount of a polyolefin.

6 Claims, No Drawings

POLYCARBONATE COMPOSITION

COMPOSITION

Polycarbonate polymers are excellent molding materials as products made therefrom have high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

It is well known that the thick section impact strength as measured by Notched Izod of polycarbonate polymers can be improved through the addition of polyolefins, for example polyethylene, to the polymer composition as disclosed by O'Connell in U.S. Pat. No. 3,801,673, assigned to the assignee of the present invention.

The chainstoppers, otherwise known as endcappers, which have, up to the present, been used in preparing the polycarbonate polymers include materials such as phenol, paratertiarybutylphenol, chroman 1 and other similar compounds. Stearic acid and stearoyl chloride have been used in the past as chainstoppers in polycarbonates to improve the demolding properties for injection molding purposes, see German Offenlegungeschifts Nos. 26 20 256 and 26 20 255.

SUMMARY OF THE INVENTION

One object of the present invention is to provide a novel thermoplastic resin composition.

Another object of the present invention is to provide a polycarbonate composition which possesses an improved thick section impact strength as measured by Notched Izod.

In accordance with this invention, there is a composition comprising a minor amount of a polyolefin in admixture with a high molecular weight polymer having as a repeating unit an aromatic carbonate,

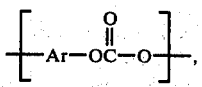

said polymer endcapped with

XR wherein

X is derived from an organic moiety having a single substituent reactive with the acidic hydrogen of a phenol or a chlorine of phosgene; and R is alkyl of about five to about twenty carbon atoms, inclusive, alkenyl of about five to about twenty carbon atoms, inclusive, said alkenyl bearing up to three double bonds; cycloalkyl of about five to about 17 carbon atoms, inclusive; cycloalkenyl of about five to about 17 carbon atoms, inclusive; alkylcycloalkyl and alkylcycloalkenyl wherein the cyclic portion has about five to about ten carbon atoms, inclusive; and the alkyl portion has from one to about five carbon atoms, inclusive; and aryl having from six to fourteen carbon atoms, inclusive.

DETAILED DESCRIPTION OF THE INVENTION

It has been discovered that by preparing an aromatic carbonate polymer endcapped with XR, as described above, and admixing such aromatic carbonate polymer with an impact modifier, a polymer composition is obtained which has an enhanced thick section impact strength as measured by Notched Izod. It is believed that the hydrocarbon chainstoppers render the aromatic carbonate polymer more compatible with the polyolefin impact modifier.

As previously mentioned, the endcapping portion of the polymer is XR. Illustrative examples of suitable organic moieties from which X is derived are phenol, carboxyl, carboxyl halide, preferably chloride, and other groups which are reactive with a phenolic hydrogen or a chlorine of phosgene. Since there is only one reactive group on the moiety from which X is derived, the polymer chain is stopped. With respect to the R parameters, alkyl and alkenyl include branched chain as well as normal molecules. Examples of alkyl are n-pentyl, n-heptyl, n-nonyl, n-dodecyl, n-eicosyl, n-stearyl, isostearyl, 2,2-dimethylbutyl, neopentyl, isopalmityl and the like. Examples of alkenyl include pentene-1-yl, hepten-2-yl, isoocten-3-yl and the hydrocarbyl portions of oleic acid, linoleic acid and cis, cis, cis -9, 12, 15-octadecatriene acid. Examples of cycloalkyl include cyclopentyl, cycloheptyl and cyclononyl. Examples of alkenyl include cyclopentenyl and cyclodecenyl. Examples of alkylcycloalkyl include methylcyclopentyl and isopropylcycloheptyl. Examples of alkylcycloalkenyl include ethylcyclohexenyl and n-butylcyclononenyl. Examples of aryl include phenyl, napthyl and phenanthryl.

In the preparation of the aromatic carbonate polymer containing the above-identified chainstoppers, the chainstoppers are employed in amounts varying from about 1 mole percent to about 7 mole percent, preferably between about 3.0 and 4.2 mole percent, based upon the number of moles of dihydric phenol.

The endcapping agents of the instant invention are well known in the art and are prepared by well known methods. An illustration of the agents which are useful in the present invention are the aliphatic carboxylic acids. The aliphatic carboxylic acids which can be employed include, for example, caprylic acid, capric acid, lauric acid, hyristic acid, palmitic acid, stearic acid, oleic acid and the like, as well as acids having a ring structure such as phenanthrylic acid for example. Preferred endcapping agents are stearic acid and oleic acid.

In the practice of the invention, the hydrocarbon terminated aromatic polycarbonate composition is admixed with a polyolefin. Polyolefins act as impact modifiers in polycarbonate compositions increasing the impact strength of the same. Suitable polyolefins for use in the present invention include, for example, polyethylene, polypropylene, polyisobutylene, ethylene-propylene diene copolymers, copolymers and terpolymers. Other polyolefins suitable for use herein will be apparent to those skilled in the art. The preferred polyolefins are polyethylene and polypropylene. These polyolefins, copolymers and terpolymers are available commercially.

The amount of the polyolefin present in the composition of the present invention can range from about 1 part to about 10 parts per hundred parts by weight, of the hydrocarbon terminated aromatic polycarbonate.

Preferably, the polyolefin is present in amounts of between about 4 to about 6 parts, most preferably 4.3 parts per hundred parts by weight of the aromatic polycarbonate.

In the practice of this invention, the high molecular weight hydrocarbon terminated aromatic polycarbonates that can be employed herein are homopolymers and copolymers and mixtures thereof which have an intrinsic viscosity of about 0.40 to about 1.0 dl/g as measured in methylene chloride at 25° C. that are prepared by reacting a dihydric phenol with a carbonate precursor. Typical of some of the dihydric phenols that can be employed in the practice of this invention are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, and the like; dihydric phenol ethers such as bis(4-hydroxyphenyl) ether, bis(3,5-dichloro-4-hydroxyphenyl) ether, and the like; dihydroxydiphenyls such as p,p'-dihydroxydiphenyl, 3,3' dichloro-4,4'-dihydroxydiphenyl, and the like; dihydroxyaryl sulfones such as bis(4-hydroxyphenyl) sulfone, bis(3,5-dimethyl-4-hydroxyphenyl) sulfone, and the like; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene and the like; and dihydroxy diphenyl sulfoxides such as bis(4-hydroxyphenyl) sulfoxide, bis-(3,5-dibromo-4-hydroxyphenyl) sulfoxide, and the like. A variety of additional dihydric phenols are also available to provide carbonate polymers and are disclosed in U.S. Pat. Nos. 2,999,835; 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, and the like.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for uses herein include bis-haloformates of dihydric phenols (bischloroformates of ethylene glycol, neopentyl glycol, polyethylene glycol, etc.). While other carbonate precursors will occur to those skilled in the art, carbonyl chloride also known as phosgene is preferred.

Also included are the dihydric phenols, the di-carboxylic acids and the carbonate precursors as are disclosed in U.S. Pat. No. 3,169,121 which is incorporated herein by reference.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkali earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethylammonium bromide, tetra-n-heptylammonium iodide, tetra-n-propyl ammonium bromide, tetramethylammonium chloride, tetramethylammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetracarboxylic anhydride and the like. The preferred polyfunctional aromatic compounds are trimellitic anhydride or trimellitic acids or their haloformyl derivatives.

Also included herein are blends of a linear polycarbonate and a branched polycarbonate.

The composition of the instant invention can be prepared by blending the high molecular weight endcapped aromatic polycarbonate with the polyolefin impact modifier by conventional methods.

The endcapped aromatic carbonate polymers are prepared by reacting a chainstopper previously mentioned, with the dihydric phenol and carbonate precursor in the presence of the acid acceptor, catalyst and suitable solvent system.

Obviously, other materials can also be employed with the aromatic carbonate polymer of this invention and include such materials as anti-static agents, pigments, thermal stabilizers, ultraviolet stabilizers, reinforcing fillers and the like.

PREFERRED EMBODIMENTS OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE

To a ten gallon reactor vessel is added 5 lbs. (10 moles) of bisphenol A, 7-liters of methylene chloride, 5.5-liters of water, 99.4 g (3.5 moles %) of stearic acid, 14 ml of triethylamine, and 3.4 g sodium gluconate. The pH is adjusted to 11 and 1080 g of phosgene delivered at a rate of 36 g/min. for 30 minutes while 35% aqueous caustic is used to control the pH at 11. The mixture is diluted with 5-liters of methylene chloride and the phase separated to remove the brine solution produced during the polymerization. The methylene chloride phase is washed once with 0.01 N HCl, and three times with water. The resultant polymer is recovered from the methylene chloride by precipitation using 125 psi steam pressure, followed by drying in a nitrogen purged fluid bed dryer to yield a white polycarbonate resin with IV in $CH_2Cl_2$ at 25° C. of 0.50 dl/g.

Using the same procedure, other endcapped aromatic carbonates were prepared using phenol and oleic acid as the agent.

One hundred parts of the polycarbonate composition is mixed with 0.1% of a phosphite epoxide color stabilizer manufactured by the Argus Chemical Corporation of Brooklyn, N.Y. under the trade name Mark 135 and 4% of a high density polyethylene manufactured by the U.S. Industrial Chemicals Co. under the designation LB 703. The resulting mixture is then fed through an extruder which was operated at about 260° C., and the extrudate cooled in a water bath and then comminuted into pellets. The pellets are then injection-molded at about 300° C. into test bars of about 2½ in. by ½ in. by about ¼ in. thick. The impact strength of these bars is measured according to Notched Izod Test, ASTM D-256.

TABLE 1
LEXAN-140 POLYCARBONATE

| Polyolefin Impact Modifier | Chainstopper | Impact Strength Foot Pounds/Inch ¼ Inch Notched Izod |
|---|---|---|
| 4% Polyethylene | Phenol | 10.11 |
| 4% Polyethylene | Stearic Acid | 13.08 |
| 4% Polyethylene | Oleic Acid | 11.18 |

It can be seen from the date in Table 1 that when certain endcapping agents, i.e. stearic acid or oleic acid, are employed in aromatic carbonate polymers in admixture with a polyolefin a compatability is established between the aromatic carbonate polymer and polyolefin as expressed in terms of the improved ¼ in. Notched Izod impact strength over the phenol endcapped polymer.

It should be noted that multiple ring natural products falling within the general definition of cycloalkyl or cycloalkenyl are also effective chain-stopping agents. An example of such an XR compound is abietic acid.

It will thus be seen that the objects set forth above among those apparent from the preceding description are efficiently attained and since certain changes may be made in carrying out the above process and in the composition set forth without departing from the scope of this invention, it is intended that all matters in the above description shall be interpreted as illustrative and not in a limiting sense.

What is claimed is:
1. A composition comprising
   a. a high molecular weight polymer having as a repeating unit an aromatic carbonate

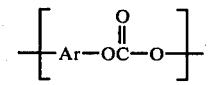

said polymer endcapped with

XR wherein X is derived from an organic moiety having a single substituent reactive with the acidic hydrogen of a phenol or the chlorine of phosgene and R is selected from the group consisting of the hydrocarbyl portion of the following acids or acid chlorides; stearic, isostearic, palmitic, myristic, lauric, pelagronic, caproic, caprylic, oleic, linoleic and abietic in admixture with
   b. about one to about ten parts of a polyolefin selected from the group consisting of polyethylene or polypropylene, said parts per 100 parts by weight of the polymer of section a.

2. A composition in accordance with claim 1 wherein X is derived from a carboxylic acid or carboxylic acid halide.

3. A composition in accordance with claim 2 wherein XR is derived from stearic acid, stearic acid chloride, lineolic acid or linoleic acid chloride.

4. A composition in accordance with claim 2 wherein the polyolefin is from about four to about six parts.

5. A composition in accordance with claim 3 wherein the polyolefin is from about four to about six parts.

6. A composition in accordance with claims 2 or 5 wherein Ar is derived from bisphenol A.

* * * * *